Dec. 20, 1966     J. S. KAMBORIAN     3,292,191
APPLICATION OF CEMENT TO A SHOE UPPER
Filed May 11, 1964     5 Sheets-Sheet 1

Dec. 20, 1966     J. S. KAMBORIAN     3,292,191
APPLICATION OF CEMENT TO A SHOE UPPER
Filed May 11, 1964     5 Sheets-Sheet 3

United States Patent Office 3,292,191
Patented Dec. 20, 1966

3,292,191
APPLICATION OF CEMENT TO A SHOE UPPER
Jacob S. Kamborian, 70 Crestwood Road,
West Newton, Mass. 02165
Filed May 11, 1964, Ser. No. 366,494
27 Claims. (Cl. 12—145)

This application is a continuation-in-part of copending application Serial No. 356,900, filed April 2, 1964, and now abandoned.

This invention relates to the cement lasting of shoes by wiping a selected portion of a shoe upper against the corresponding portion of a shoe insole and bonding the portions by way of a cement interposed between them. It is currently accepted practice to employ a thermoplastic cement for this purpose. Such cements are solid at ambient temperatures and are heated to a liquid state before being applied. The cements cool back to their solid state shortly after application to one or both of the aforesaid portions and it is therefore necessary to wipe the margin portion against the insole portion before the cement has had a chance to solidify.

In the instant invention a shoe assembly is provided that includes a last having the upper mounted thereon with the selected portion of the upper extending away from the shoe assembly bottom. An applicator is caused to bear against the upper portion, cement is extruded from the applicator against the upper portion and the applicator is then moved away from the shoe assembly bottom along the margin portion to spread the cement along the margin portion.

In the illustrative embodiment of the invention, the heel seat lasting machine disclosed in pending application Serial No. 353,462, filed March 20, 1964 has been modified to incorporate a cement applying mechanism and the cement is applied to the heel portion of a shoe upper. The accompanying drawings and the detailed description only disclose a portion of the machine that is needed for an understanding of the invention. Reference is made to application Serial No. 353,462 for a more detailed disclosure of the machine.

Figures 1, 2:
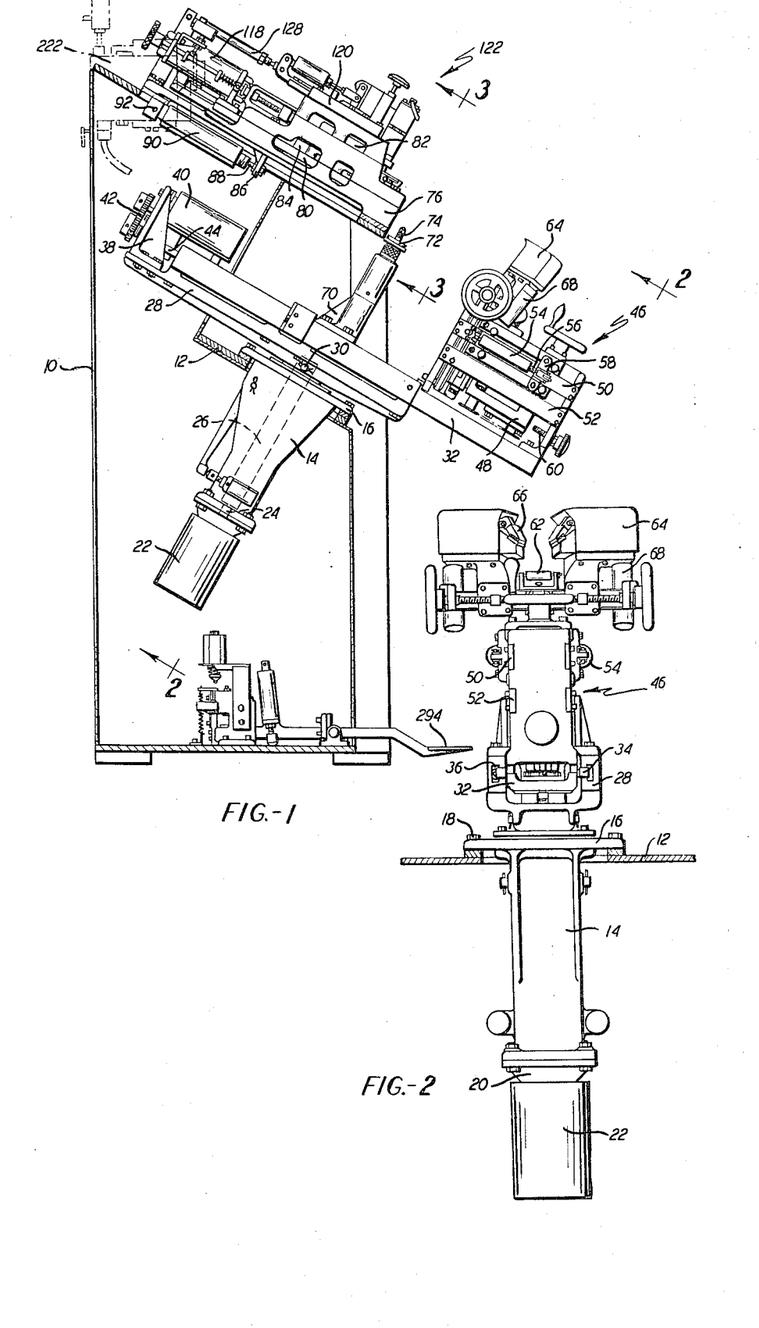
FIG. 1 is a side elevation of the machine.
FIG. 2 is a view taken on the line 2—2 of FIG. 1.

Referring to FIG. 1, the machine includes a frame 10 that comprises a base 12 and a housing 14. The machine is tilted about 30 degrees to enable the operator to have ready access thereto. For ease of explanation, the direction of the base 12 will be referred to as horizontal and the direction of the housing 14 will be referred to as vertical. In operating the machine, the operator stands to the right of the machine as seen in FIG. 1, and parts extending toward the operator (to the right in FIG. 1) will be described as extending forwardly while parts extending away from the operator (to the left in FIG. 1) will be described as extending rearwardly.

The housing 14 includes a flange 16 that is secured to the base 12 by bolts 18 (FIGS. 1 and 2). A hanger 20, bolted to the bottom of the housing 14, has a vertically extending air operated motor 22 secured thereto. The piston rod 24 of the motor 22 is connected to a post 26 that is slidably guided for vertical movement in the housing 14. A shoe supporting platform 28 has a socket in its bottom which receives the top of the post 26, and the platform and post are connected by a pin 30. A base 32 is mounted on the platform 28 for horizontal forward and rearward movement by way of rollers 34 rotatably mounted in the base that are movable in tracks 36 in the platform. A bracket 38, secured to the read end of the platform 28, has a reversible motor 40 mounted thereon. The motor 40 is connected through a gear train 42 to a shaft 44 whose rear end is rotatably mounted in the bracket 38. The forward end of the shaft 44 is formed into a screw (not shown) that is threaded into the base 32. Rotation of the motor 40 will cause rotation of the shaft 44 and thereby move the base 32 forwardly or rearwardly depending on the direction of rotation of the motor 40.

The front of the base 32 has a framework 46 extending upwardly thereof. A horizontal stretch carriage 48 is supported on horizontal bars 50 and 52 of the framework 46 for horizontal movement. An air actuated motor 54 is pivotally connected to each bar 50, and each motor 54 has a piston rod 56 that is connected to the horizontal stretch carriage 48 by a bracket 58. A screw 60, threaded into the framework 46, serves as an adjustable stop to limit the extent of forward movement of the carriage 46 under the influence of the motors 54. A toe rest roller 62 is mounted in the framework 46. A pair of pincer housings 64 are mounted on the carriage 48 on opposite sides of the toe rest 62 for vertical movement, and an air operated motor (not shown) is provided in the framework for effecting the vertical movement of the pincer housings. A pincer 66, comprising a pair of relatively movable jaws, is mounted in each pincers housing. An air operated motor 68 is provided for effecting the opening and closing of the jaws of each of the pincers 66. The parts in the framework 46 are so constructed that movement of the carriage 48 in response to actuation of the motors 54 moves the pincers 66 horizontally without effecting movement of the toe rest roller 62 and movement of the pincers 66 vertically by the aforementioned air operated motor does not effect movement of the toe rest roller 62.

A base 70 is secured to the platform 28 rearwardly of the framework 46. A shoe assembly support comprising a plate 72 is mounted on the base 70 and a last pin 74 extends upwardly of the plate 72.

Figures 3, 6, 7:
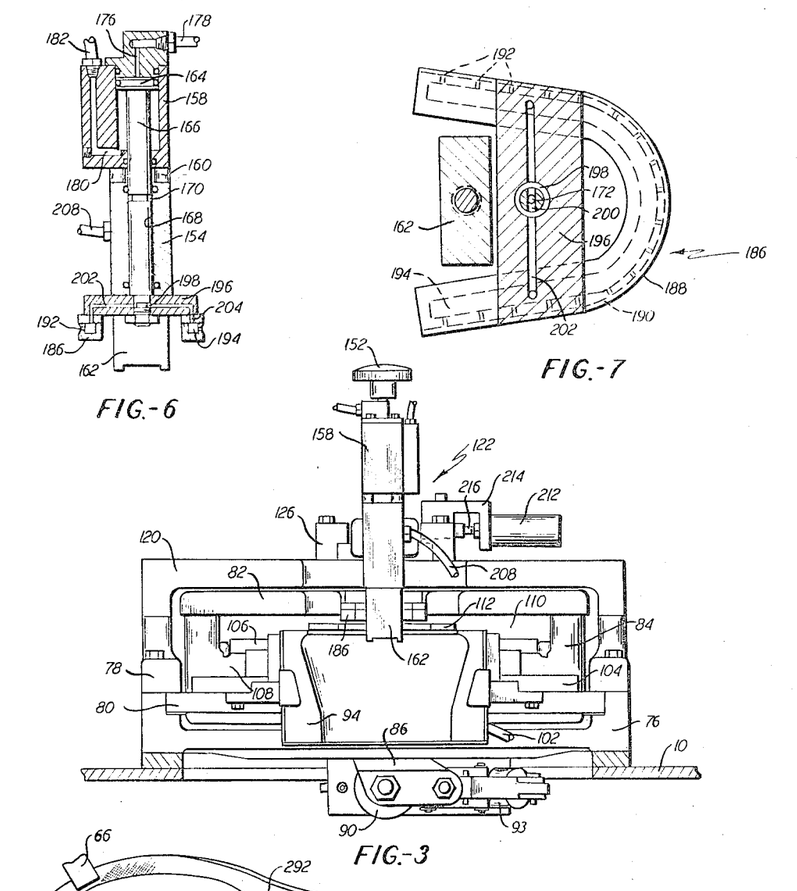
FIG. 3 is a view taken on the line 3—3 of FIG. 1.
FIG. 6 is a view taken on the line 6—6 of FIG. 4.
FIG. 7 is a view taken on the line 7—7 of FIG. 5.

As shown in FIGS. 1 and 3, a head 76 is mounted on the frame 10 rearwardly of the framework 46 and the last pin 74. The head 76 and gibs 78 that are bolted to the head form a guideway that receives a main slide plate 80. A cover 82 is spaced above the plate 80 at its forward end. The cover 82 is connected to the plate 80 by means of spacers 84. The plate 80 has a lug 86 depending therefrom that is bolted to the piston rod 88 of an air operated motor 90 and the motor 90 is connected to a hanger 92 depending from the frame 10. The motor 90 effects the forward and rearward movement of the plate 80 and the parts carried thereby, and a brake (not shown) actuated by an air operated motor 93 acts to lock the plate 80 in position.

A U-shaped clamping pad 94 is provided that is made of an expandable, deformable material such as rubber. The pad 94 has a bight 96 (FIG. 12) and a pair of legs 98 extending forwardly of the bight. The pad has a cavity 100 (FIG. 12A) into which pressurized fluid such as air may be forced by way of a line 102 (FIG. 3) to expand the inner walls of the pad for reasons described below. The bight 96 is connected to a beam (not shown) that is slidably mounted in the plate 80. The legs 98 of the pad are each connected to a lever 104 that is drivable by an air actuated motor (not shown) mounted on the plate 80, these motors serving to move the pad legs 98 inwardly.

Figures 12, 12A, 13, 14, 15:
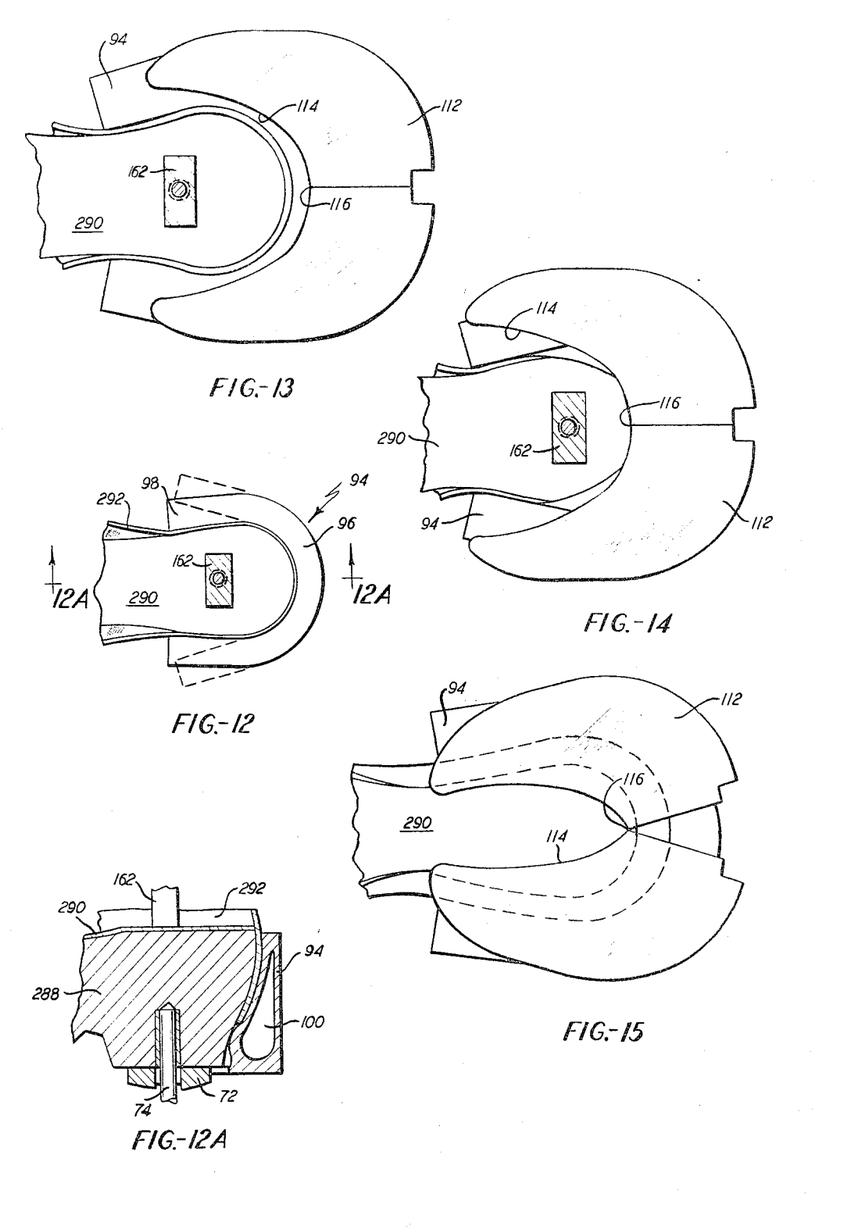
FIG. 12 is a view of the shoe assembly showing a heel clamping pad bearing against the heel of the shoe assembly.
FIG. 12A is a view taken on the line 12A—12A of FIG. 12.
FIG. 13 is a top view of the shoe assembly showing wipers in the position they assume before going through a wiping stroke.
FIG. 14 is a top view of the shoe assembly showing the wipers part way through their wiping stroke.
FIG. 15 is a top view of the shoe assembly showing the wipers after they have completed their wiping stroke.

A wiper supporting slide plate 106 is slidably mounted for forward and rearward movement on shoulders 108 on the spacers 84 above the main slide plate 80. A pair of wiper cams 110, that rest on the plate 106 and underlie the cover 82, have wipers 112 mounted thereon (FIGS. 3 and 13). The wipers have side surfaces 114 that diverge forwardly of a bight indicated by numeral 116 in FIG. 13 and hereinafter referred to as the vertex of the wipers. Wiper drive means that include an air actuated motor 118 (FIG. 1) are provided to move the wipers in a wiping stroke in the manner described below.

Figure 4:
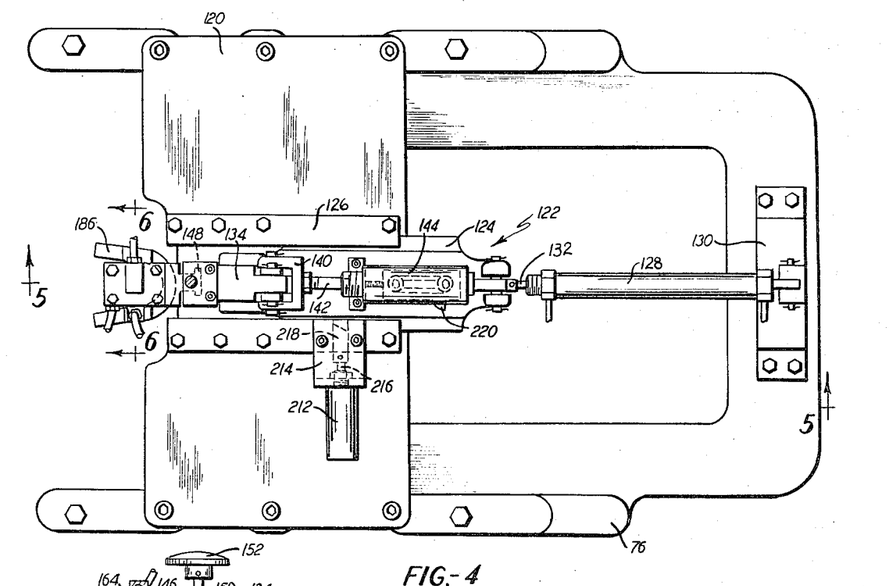
FIG. 4 is a plan view of a hold-down and cement applicator unit in the machine.
Figure 5:
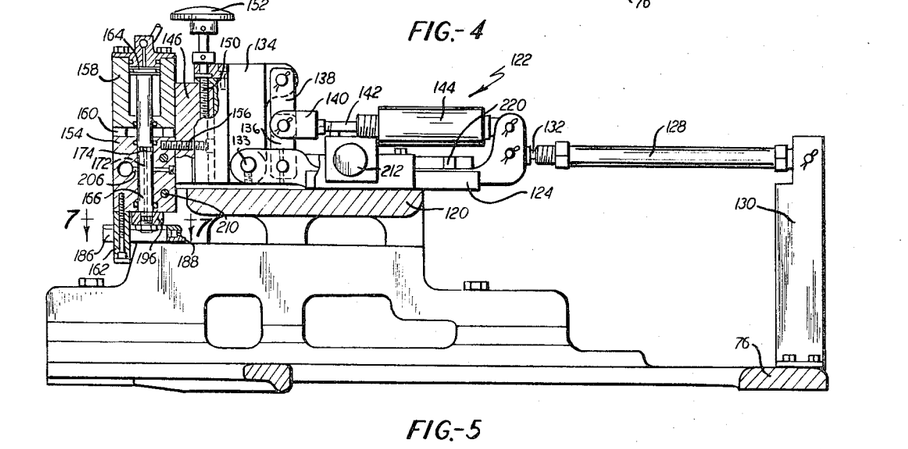
FIG. 5 is a view taken on the line 5—5 of FIG. 4.

The head 76 has a cover 120 that overlies the cover 82 and supports a hold-down and cement applicator unit 122. As shown in FIGS. 4 and 5, the unit 122 includes a slide 124 that is constrained for forward and rearward movement on the cover 120 by gibs 126 bolted to the cover. An air operated motor 128, mounted on a flange 130 that is secured to the head 76, has a piston rod 132 that is connected to the slide 124. The forward end of the slide 124 is pivoted through a pin 133 to a block 134. A toggle link 136 is pivoted to and extends upwardly of the slide 124. A toggle link 138 is pivoted to and extends downwardly from the block 134. The adjoining ends of the toggle links 136 and 138 are pivoted to a clevis 140 that is mounted on the piston rod 142 of an air operated motor 144. The motor 144 is mounted on the slide 124. A hold-down mount 146 is mounted for vertical movement in a dove-tailed slot 148 formed in the block 134. A screw 150, that is rotatably mounted in the block 134, is threaded into the mount 146. The screw 150 has a handle 152 thereon whereby the vertical position of the mount 146 may be adjusted by rotating the handle. A housing 154 is connected to the mount 146 by bolts 156. A cylinder 158 is located above the housing 154 and is connected thereto by spacer bolts 160. A hold-down foot 162 is connected to and extends downwardly of the housing 154.

A piston 164 (FIG. 6), slidable in the cylinder 158, has a plunger 166 connected thereto that extends downwardly through the bottom of the cylinder 158 and through a vertical orifice 168 in the housing 154. The portion of the plunger 166 that lies in the orifice 168 has an annular groove 170. A bore 172 extends through the plunger 166 from the groove 170 to the bottom of the plunger. A port 174 connects the groove 170 and the bore 172. A passage 176 is provided in the cylinder 158 to admit pressurized air through a line 178 to lower the plunger 166 and a passage 180 is provided in the cylinder to admit pressurized air through a line 182 to raise the plunger.

A U-shaped cement applicator 186 (FIGS. 7, 11 and 11A) is located to extend about the hold-down foot 162. The applicator has a rearwardly directed peripheral face 188. A groove 190 extending along the peripheral face 188 is intersected by a plurality of ports 192. The ports 192 lead into a cavity 194 in the applicator. A strap 196, straddling the applicator 186 and welded thereto, is bolted to the bottom of the plunger 166. An annular groove 198 on the plunger 166 within the strap 196 is connected to the bottom of the bore 172 by a port 200. The groove 198 is in communication with the cavity 194 by way of passages 202 in the strap 196 and passages 204 in the applicator 186. A passage 206 in the housing 154 intersects the orifice 168 and is so constructed as to be in alignment with the groove 174 when the plunger 166 is lowered from its FIG. 5 position. The passage 204 is in communication with an end of a flexible tube 208.

Electric cartridge heaters 210 are provided in the housing 154 and other electric heaters (not shown) are provided in the strap 196.

An air actuated motor 212 is mounted on a bracket 214 that is bolted to one of the gibs 126 (FIGS. 3 and 4). The piston rod 216 of the motor 212 has a lug 218 mounted thereon that is adapted to be brought into and out of alignment with a lug 220 on the slide 124.

Figures 8, 10, 11, 11A:
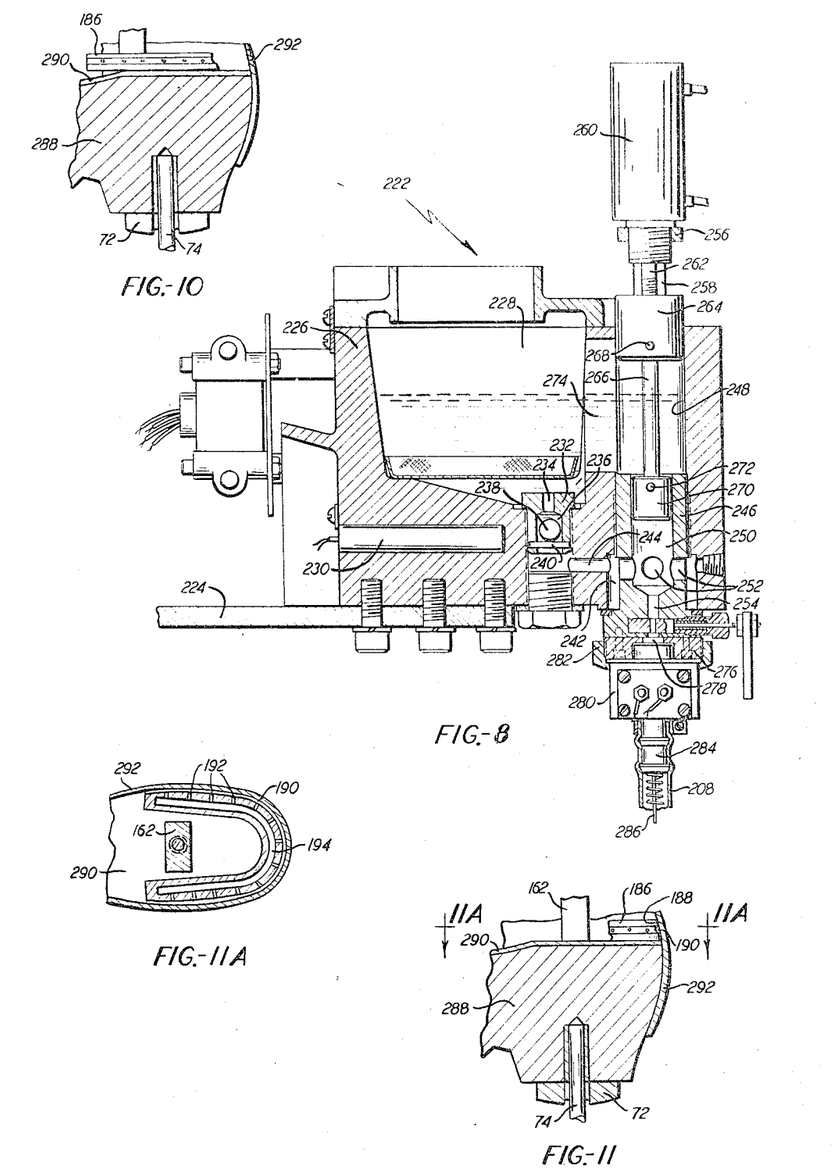
FIG. 8 is a section in elevation of a cement extruding mechanism.
FIG. 10 is a view of the shoe assembly with the cement applicator bearing on an insole located on the last bottom, the applicator being spaced from the heel portion of the upper margin.
FIG. 11 is a view of the shoe assembly with the applicator bearing against the heel portion of the upper margin.
FIG. 11A is a view taken on the line 11A—11A of FIG. 11.

An extruding mechanism 222 is mounted on the frame 10 by means of a base 224 bolted thereto (see FIGS. 1 and 8). The extruding mechanism, which is constructed similarly to the one shown in Patent No. 3,221,937 includes a cement pot 226. The pot is made of a heat conductive material such as aluminum and includes a well 228 in which thermoplastic cement may be deposited. Heating means, that include an electric cartridge heater 230 embedded in the pot, are provided to heat the pot and melt the cement. A ferrule 232 is threaded into a hole in the bottom of the well. The ferrule has a centrally located small diameter passage 234 that opens into a large diameter passage 236. A ball 238, resting on a pin 240 extending across the passage 236, is cooperative with the passage 234 to act as a valve in the manner described below. The passage 236 opens into a chamber 242 by way of a port 244. A sleeve 246, threaded into a guide hole 248 above the chamber 242, has an axial bore 250 that intersects a plurality of radial ports 252 that extend from the bore 250 to the chamber 242. The bore 250 is connected to the bottom of the sleeve 246 by a bore 254. A plate 256 is supported above the pot 226 by a pair of spacer sleevs 258, only one of which is shown in FIG. 8. An air operated motor 260 is threaded into the plate 256 and has a piston rod 262 depending therefrom. A stem 264 is secured to the lower end of the piston rod 264 and is slidable in the guide hole 248. A rod 266 is connected at its upper end to the stem 264 by a pivot pin 268. A plunger 270, that is slidable in the bore 250, is connected to the lower end of the rod 266 by a pivot pin 272. A cut-out 274 provides communication between the well 228 and the guide hole 248. A base 276 is fitted to the bottom of the sleeve 246 and has a hole 278 that is in communication with the bore 254. A bracket 280 is fitted to the bottom of the base 276 by a threaded cap 282. The bracket 280 has a hole (not shown) extending therethrough that is in communication with the hole 278 and has a hollow prong 284 extending downwardly thereof. The end of the tube 208 remote from the housing 154 is fitted onto the prong 58.

The tube 208 is constructed similarly to that shown in the aforementioned application Serial No. 285,446 and is made of a flexible material that is thermally and electrically insulative such as silicone. A resistor wire 286 extending through the tube and connected to a source of electricity serves to apply heat to fluid passing through the tube.

In the idle condition of the machine, the piston rod 24 is retracted into the motor 22 to maintain the plate 72, the last pin 74, the pincers 66 and the toe rest 62 in a lowered position, the piston rods 56 are retracted into the motors 54 to maintain the carriage 48 in a rearward position, the pincers 66 are maintained in a lowered position with respect to the carriage 48, the motors 68 maintain the jaws of the pincers 66 open, the piston rod 88 is retracted into the motor 90 to maintain the main slide plate 80 in a rearward position, the motor 93 maintains the aforementioned brake for the main slide plate 80 in unlocked position, the lever legs 104 are maintained in an open position by their driving motors to maintain open the legs 98 of the pad 94, there is no pressurized fluid in the line 102 so that the pad 94 is deflated, the wiper supporting slide plate 106 is maintained in a rearward position with respect to the main slide plate 80 and the wipers 112 are maintained in the open position indicated in FIG. 13, the piston rod 132 is retracted into the motor 128 so that the slide 124 and the unit 122 are in a rearward out-of-the-way position, the piston rod 142 is projected out of the motor 144 so that the hold-down foot 162 and the applicator 186 are in the relatively lowered position indicated in FIG. 5, the plunger 166 is in a raised position in the cylinder 158 as indicated in FIG. 5 with the applicator 186 above the hold-down foot 162 and the piston rod 216 is retracted into the motor 214 to maintain the lug 218 out of alignment with the lug 220. Thermoplastic cement is deposited in the well 228 of the pot 226 by any means found desirable, as for example by the dispensing mechanism shown in Patent No. 3,011,042. The cement is maintained in a molten condition in the pot 226 by means of the heating means in the pot including the heater 230. At this time the plunger 270 is maintained by the motor 260 in the raised FIG. 8 position and the ball 238 is resting on the pin 240 so that the molten cement gravitates into the chamber 242 by way of the passages 234 and 236 and the port 244. From the chamber 242, the molten cement enters and fills the bore 250 by way of the radial ports 252 and fills the tube 208 by way of the bore 282, the hole 278 and the hole in the bracket 280. From the tube 208 the molten cement passes into the passage 206 where it is blocked by the plunger 166. The heated resistor wire 286 in the tube 208 serves to maintain the cement in the tube molten. The heaters 210 in the housing 154 and the heaters (not shown) in the strap 196 serve to maintain the cement molten while it is in the housing and during the below described extrusion of the cement out of the ports 192.

Figures 9, 9A:
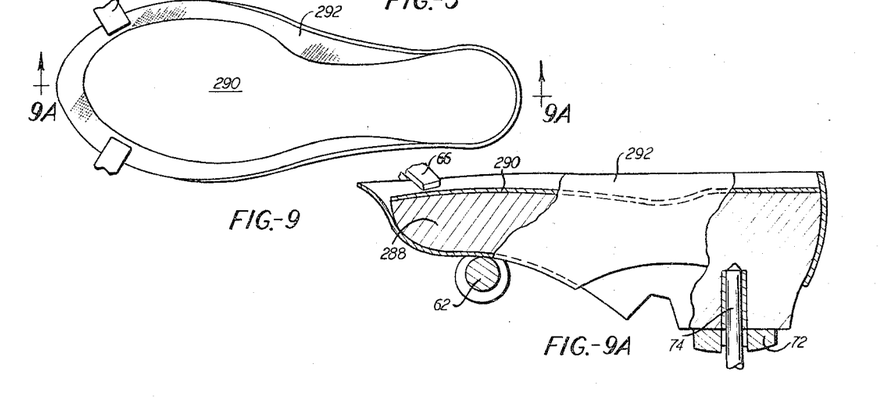
FIG. 9 is a plan view of the shoe assembly after it has been placed in the machine and the forepart portions of the upper margin have been gripped by pincers.
FIG. 9A is a view taken on the line 9A—9A of FIG. 9.

Referring to FIGS. 9 and 9A, a shoe assembly comprising a last 288 having an insole 290 mounted on its bottom and an upper 292 draped thereon is placed by the operator bottom-up on the plate 72 with the last pin 74 entering the conventional last pin hole in the last. The toe portion of the upper and last is supported on the toe rest roller 62 and the forepart portions of the upper margin are inserted between the open jaws of the pincers 66. At this time the upper surface of the upper 292 extends above the insole 290 as indicated in FIG. 9A.

The operator now depresses a pedal platform 294 (FIG. 1) a certain amount to actuate the machine control circuit (not shown) to actuate the motors 68 to close the pincers 66 and cause the pincers jaws to grip the forepart portions of the upper margin and bring the parts to the position shown in FIGS. 9 and 9A. At this point the operator may inspect the work to see if the pincers 66 are properly gripping the upper margin. If they are not, he may release the platform 294 to thereby cause the pincers to open. If the upper margin is being properly gripped by the pincers 66 the operator further depresses the platform 294 a certain amount to actuate the motors 68 to move the carriage 48 together with the pincers 66 forwardly to thereby horizontally stretch the upper in the direction of the toe of the last and cause a firm wrapping of the upper about the heel of the last. At this point the operator may again inspect the work and release the platform 294 to return the parts to their original position if the upper is not being properly engaged by the pincers 66 and stretched about the heel of the last.

The operator, assuming he is satisfied with the condition of the work in the machine, now steps further on the platform 294. In response to this the platform is caused to be locked in its down position so that the operator may take his foot off the platform. The motor 128 is now actuated to move the unit 122 forwardly from its out-of-the-way position to a working position above the shoe assembly. Prior to this time in the machine cycle the unit 122 had been in its rearward out-of-the-way position so as not to interfere with the placement of the shoe assembly on the plate 72 and last pin 74 and also to not interfere with the operator's observing whether the upper was properly gripped by the pincers 66 and whether the upper was properly stretched about the heel of the last as a result of the forward horizontal stretching movement of the pincers. In this movement of the unit 122, the hold-down foot 162 and the applicator 186 move inwardly of the heel end of the shoe assembly and the lug 220 moves forwardly of the lug 218. After this, pressurized air enters the cylinder 158 through the line 178 and 176 to lower the applicator 186 until it engages the insole 290 and the motor 212 is actuated to move the lug 218 into alignment with the lug 220. At this time the parts assume the position shown in FIG. 10.

Now the motor 22 is actuated to raise the post 26 together with the plate 72, last pin 74, toe rest 62 and pincers 66 until the insole 290 bears against the hold-down foot 162. The elevation of the hold-down foot had been adjusted by rotation of the handle 152 to position the bottom of the hold-down foot slightly below the bottoms of the wipers so that the raising of the shoe assembly by the actuation of the motor 22 brings the insole to this level regardless of the height of the last or the thickness of the insole and clamps the shoe assembly between the plate 72 and the hold-down foot 162. The upward force exerted by the motor 22 is greater than the downward force exerted by the pressurized air entering the cylinder 158 through the passage 176 so that the applicator 186 rises upwardly with the shoe assembly. At the same time as the shoe assembly is rising the motor 128 is actuated to move the unit 122 rearwardly until the peripheral face 188 of the applicator 186 bears against the heel portion of the margin 292. The rearward movement of the applicator is either terminated by the resistance to movement of the upper margin or by the engagement of the lug 220 with the lug 218. The degree to which the resistance offered by the upper margin can terminate the rearward movement of the applicator depends on the pressure of the air moving the piston rod 132 rearwardly and the stiffness of the material out of which the upper is fashioned, and should the upper margin fail to stop the rearward movement of the applicator, this movement is stopped by the engagement of the lugs 218 and 220. The parts are so constructed that when the applicator has terminated its upward movement due to the rise of the shoe assembly the passage 206 is in alignment with the groove 174. At this time the shoe assembly engaging members assume the position shown in FIGS. 11 and 11A.

Now the motor 260 is actuated to move the plunger 270 downwardly to create a pressure which forces the ball 238 upwardly to close the passage 234 and extrudes cement through the tube 208 and the conduits formed by the passage 206, groove 170, port 174, bore 172, port 200, groove 198, passages 202 and 204, cavity 194 and ports 192 against the margin of the upper 292 that is engaged by the peripheral face 188. The cement in passing through the ports 192 runs along the groove 190 so that a continuous ribbon of cement is deposited on the heel portion of the upper margin adjacent the insole 290. Shortly after the cement is extruded through the ports 192 against the upper margin pressurized air enters the cylinder 158 through the line 182 and passage 180 to raise the applicator 186 to the FIG. 6 position. As soon as the applicator commences its rise the groove 170 moves out of alignment with the passage 206 to thereby terminate the flow of cement through the applicator even though the plunger 270 is still moving downwardly. The rise of the applicator causes the peripheral face 188 to spread the cement upwardly along the upper margin to thereby coat the greater part of the upper margin with cement which is beneficial when the upper margin is wiped against the insole and bonded thereto by the cement as described below. The rise of the applicator also takes it out of the path of the wipers when they effect their wiping stroke as described below. The termination of the cement extrusion through the applicator as it begins its rise ensures that an excess quantity of cement is not deposited and spread on the upper margin.

After the applicator 186 has risen the motor 260 is actuated to raise the plunger 270 to its FIG. 8 position and thus terminate the pressure forcing the cement through the tube 208 and into the housing 154. The timing of the parts is such that the plunger is still moving downwardly at the time that it is caused to be moved upwardly so that there is a continuous pressure to force cement through the tube 208 between the time that the plunger 270 begins its downward movement and the time it begins its upward movement. Between cycles of downward and upward movements of the plunger 270 the molten cement fills the cement pot parts, the tube 208 and the passage 206 in the manner described above. During the upward and downward movements of the plunger 270, there is molten cement both above and below the plunger. There is clearance between the plunger 270 and the bore 250 that is sufficiently large to enable a film to be formed between the plunger and bore to provide the advantages described in Patent No. 3,130,876. The clearance is made sufficiently small as to prevent a substantial pressure loss during the working strokes of the plunger.

Now the motor 90 is actuated to move the main slide plate 80 forwardly and thereby move the clamping pad 94 and wipers 112 forwardly until the bight 96 of the pad 94 engages the heel end extremity of the shoe assembly as shown in dotted lines in FIG. 12. The engagement of the pad bight with the shoe assembly causes the motor 93 to be actuated to cause the aforementioned brake to lock the plate 80 in position. The main slide plate 80 had been maintained in its retracted out-of-the-way position up to this time so as to enable the operator to inspect the shoe assembly during the gripping of the upper margin by the pincers 66 and the horizontal stretching movement of the pincers without interference by the heel clamp 94 and the wipers 112. In addition, the maintenance of the heel clamp and the wipers in their out-of-the-way position enables the motor 22 to raise the shoe assembly without interference with the heel clamp and wipers. By having the forward movement of the main slide plate 80 terminated and the plate locked in position in response to engagement of the bight of the heel clamp with the heel end of the shoe assembly, it is assured that the heel clamp and wipers will be positioned adjacent the shoe assembly for the subsequently performed heel clamping and wiping operations regardless of the location of the heel end of the shoe assembly.

After the locking of the main slide plate 80, the aforementioned motor in the framework 46 is actuated to move the pincers 66 vertically and thus apply an upward tension to the upper margin at its forepart portions to thereby stretch the upper tightly on the last and assemble it in position for the subsequent heel seat lasting operation. Since the shoe assembly is clamped at this time between the plate 72 and the hold-down foot 162, upward movement of the pincers 66 does not shift the last 288.

The aforementioned motors mounted on the plate 80 are now actuated to move the levers 104 and the pad legs 98 inwardly from the dotted to the solid line position of FIG. 12 and cause all of the inner wall of the pad 94 to engage the heel of the shoe assembly. Concomitantly with the actuation of these motors, pressurized fluid (preferably air) is caused to enter the pad cavity 100 through the line 102 to expand the inner wall of the pad 94 against the shoe assembly and thereby clamp the upper 292 against the last 288 for the subsequent wiping operation. By having the bight 96 of the pad 94 engage the shoe assembly and following this with a progressive engagement of the pad legs 98 with the shoe assembly, there is provided an initial contact of the pad at the heel end of the shoe assembly and then a progressive engagement of the pad along the sides of the shoe assembly extending forwardly of the heel to ensure a smoothening out of any wrinkles there may be in the upper and a smooth firm clamping of the upper against the last. The parts now assume the position shown in FIGS. 12 and 12A.

After the heel of the shoe assembly is clamped by the inflated pad 94, the wiper driving means, including the motor 118, is actuated to cause the wipers 112 to move through a wiping stroke. First the wiper supporting slide plate 106 is caused to move forward to translate the wipers forwardly from the FIG. 13 to the FIG. 14 position without the wipers moving inwardly about the vertex 116 so that only the bight of the wiper side surfaces 114 at and adjacent the vertex 116 cross over the last to wipe the upper margin at and adjacent the heel of the last down upon the insole, and the forwardmost portions of the wiper side surfaces 114 do not engage the upper. The wipers are next caused to swing inwardly about the vertex 116 from the FIG. 14 to the FIG. 15 position without any forward translatory movement to cause the forwardmost portions of the wiper side surfaces 114 and prongs (not shown) on the undersurfaces of the wipers to cross over the last and wipe the upper margins upon the insole between the general area of the breastlines of the upper and the portion of the upper engaged by the wipers during the translation of the wipers. At about the time the pronged portions of the wipers engage the upper, the motors 68 are actuated to open the pincers 66 to release the forepart portions of the upper margin.

Towards the end of the inward movement of the wipers 112 about the vertex 116, the motor 144 is actuated to retract the piston rod 142 and thereby swing the block 134 together with the hold-down foot 162 clockwise (FIG. 5) about the pivot 133 and thus raise the hold-down foot so that the motor 22 applies pressure by the shoe assembly directly against the wiper bottoms. At the same time pressurized air under higher pressure than had heretofore entered the motor 22 now enters the motor 22 to cause the shoe assembly to be forced against the wiper bottoms under relatively high bedding pressure. At the conclusion of the wiper movement the parts are in the position shown in FIG. 15. The cement previously applied to the upper margin acts to bond the upper margin to the insole when the upper margin is wiped upon the insole.

After the wipers 112 have concluded their wiping stroke they remain in position above the insole with the motor 22 providing bedding pressure to the now wiped upper margin for a predetermined time interval that is sufficient to enable the adhesive to cool sufficiently to effect a permanent bond between the upper margin and the insole and to iron the wiped upper margin against the insole. At the end of this predetermined time interval the machine control causes the platform 294 to be unlocked so that it rises to its idle upper position. In response to this, the machine parts are returned to their idle positions and the shoe assembly is released from the machine.

It should be understood that the present disclosure is for the purpose of illustration only and that this invention includes all modifications and equivalents which fall within the scope of the appended claims.

Terms in the claims indicating positions and paths of movement such as "above" and "raising" have been employed primarily to define the relative positions and paths of movements of the parts and should be construed accordingly. Organizations which have relative positions and functional relationships between their parts that are equivalent to those defined in the claims are considered to fall within the scope of the claims regardless of whether the parts literally have the defined positions and paths of movement.

I claim:

1. A method of applying cement to a selected portion of the margin of a shoe upper preparatory to wiping said margin against the corresponding portion of a shoe insole comprising: providing a shoe assembly that includes a last having the upper mounted thereon; supporting the shoe assembly with said margin portion extending away from the shoe assembly bottom; moving an applicator against said margin portion; thereafter extruding cement from said applicator against said margin portion; and thereafter moving the applicator away from the shoe assembly bottom along said margin portion to spread the cement along said margin portion.

2. The method as defined in claim 1 further comprising: terminating the extrusion of cement as the applicator commences its movement along said margin portion.

3. A method of applying cement to a selected portion of the margin of a shoe upper preparatory to wiping said margin against the corresponding portion of a shoe insole comprising: providing a shoe assembly that includes a last having the upper mounted thereon; supporting the shoe assembly bottom-up with said margin portion extending upwardly away from the shoe assembly bottom; placing an applicator on the shoe assembly bottom, that has a peripheral face complementary to the shape of said margin portion, so that it is spaced from said margin portion; moving the applicator in a direction to bring said peripheral face against said margin portion; thereafter extruding cement from said peripheral face against said margin portion; and thereafter raising the applicator so that said peripheral face moves along said margin portion and spreads the cement along said margin portion.

4. A method of applying cement to a selected portion of the margin of a shoe upper preparatory to wiping said margin against the corresponding portion of a shoe insole comprising: providing a shoe assembly that includes a last having the upper mounted thereon; supporting the shoe assembly bottom-up with said margin portion extending upwardly away from the shoe assembly bottom; placing an applicator and a hold-down foot above the shoe assembly, the applicator having a peripheral face complementary to the shape of said margin portion; lowering the applicator against the shoe assembly bottom so that said peripheral face is spaced from said margin portion; moving the applicator in a direction to bring said peripheral face against said margin portion and raising the shoe assembly to clamp it against the hold-down foot; thereafter extruding cement from said peripheral face against said margin portion; and thereafter raising the applicator so that said peripheral face moves along said margin portion and spreads the cement along said margin portion.

5. A mechanism for applying cement to a selected portion of the margin of a shoe upper preparatory to wiping said margin against the corresponding portion of a shoe insole comprising: a support for supporting a shoe assembly that includes a last having the upper mounted thereon with said margin portion extending away from the shoe assembly bottom; an applicator; means mounting the applicator for movement toward and away from the shoe assembly bottom; extruding means operable to extrude cement from the applicator; means for positioning the applicator against said margin portion; means for thereafter operating the extruding means to extrude cement against said margin portion; and means for thereafter moving the applicator away from the shoe assembly bottom along said margin portion to spread the cement along said margin portion.

6. The mechanism as defined in claim 5 further comprising: means responsive to the commencement of the movement of the applicator along said margin portion to terminate the extrusion of cement.

7. A mechanism for applying cement to a selected portion of the margin of a shoe upper preparatory to wiping said margin portion against the corresponding portion of a shoe insole comprising: a support for supporting bottom-up a shoe assembly that includes a last having the upper mounted thereon with said margin portion extending upwardly away from the shoe assembly bottom; an applicator have a peripheral face that is complementary to the shape of said margin portion; means mounting the applicator for heightwise movement toward and away from the shoe assembly bottom; extruding means operable to extrude cement from said peripheral face; means for initially locating the applicator above the shoe assembly; means for thereafter moving the applicator in a direction to bring said peripheral face against said margin portion; means for thereafter operating the extruding means to extrude cement against said margin portion; and means for thereafter moving the applicator away from the shoe assembly bottom so that said peripheral face moves along said margin portion to spread the cement along said margin portion.

8. A mechanism for applying cement to a selected portion of the margin of a shoe upper preparatory to wiping said margin portion against the corresponding portion of a shoe insole comprising: a support for supporting bottom-up a shoe assembly that includes a last having the upper mounted thereon with said margin portion extending upwardly away from the shoe assembly bottom; means mounting the support for heightwise movement; means for initially maintaining the support in a lowered position; an applicator having a peripheral face that is complementary to the shape of said margin portion; means mounting the applicator for heightwise movement toward and away from the shoe assembly bottom and for movement along the shoe assembly bottom; extruding means operable to extrude cement from said peripheral face; means for initially locating the applicator above the shoe assembly and offset from said margin portion; a hold-down foot located above the shoe assembly; means for lowering the applicator against the shoe assembly bottom with the peripheral face spaced inwardly of said margin portion; means for thereafter moving the applicator along the shoe assembly bottom in a direction to bring the peripheral face against said margin portion and for raising the support to clamp the shoe assembly against the hold-down foot; means for thereafter operating the extruding means to extrude cement against said margin portion; and means for thereafter raising the applicator away from the shoe assembly bottom so that said peripheral face moves along said margin portion to spread the cement along said margin portion.

9. A method of wiping a selected portion of the margin of a shoe upper against the corresponding portion of a shoe insole comprising: providing a shoe assembly that includes a last having the upper mounted thereon and the insole located on its bottom; supporting the shoe assembly with said margin portion extending away from the insole; moving an applicator against said margin portion; thereafter extruding cement from said applicator against said margin portion; thereafter moving the applicator away from the insole along said margin portion to spread the cement along said margin portion; and thereafter wiping said margin portion inwardly against the insole to cause said margin portion to be attached to the insole by the cement.

10. The method as defined in claim 9 further comprising: terminating the extrusion of cement as the applicator commences its movement along said margin portion.

11. A method of wiping a selected portion of the margin of a shoe upper against a corresponding portion of a shoe insole comprising: providing a shoe assembly that includes a last having the upper mounted thereon and the insole located on its bottom; supporting the shoe assembly bottom-up with said margin portion extending upwardly away from the insole; placing an applicator on the insole, that has a peripheral face complementary to the shape of said margin portion, so that it is spaced from said margin portion; moving the applicator in a direction to bring said peripheral face against said margin portion; thereafter extruding cement from said peripheral face against said margin portion; thereafter raising the applicator so that said peripheral face moves along said margin portion and spreads the cement along said margin portion; and thereafter wiping said margin portion inwardly against the insole to cause said margin portion to be attached to the insole by the cement.

12. A method of wiping a selected portion of the margin of a shoe upper against a corresponding portion of a shoe insole comprising: providing a shoe assembly that includes a last having the upper mounted thereon and the insole located on its bottom; supporting the shoe assembly bottom-up with said margin portion etxending away from the insole; placing an applicator and a hold-down foot above the shoe assembly, the applicator having a peripheral face complementary to the shape of said margin portion; lowering the applicator against the insole so that said peripheral face is spaced from said margin portion; moving the applicator in a direction to bring said peripheral face against said margin portion and raising the shoe assembly to clamp it against the hold-down foot; thereafter extruding cement from said peripheral face against said margin portion; thereafter raising the applicator so that said peripheral face moves along said margin portion and spreads the cement along said margin portion; and thereafter wiping said margin portion inwardly against the insole to cause said margin portion to be attached to the insole by the cement.

13. A machine for wiping a selected portion of the margin of a shoe upper against the corresponding portion of a shoe insole comprising: a support for supporting a shoe assembly that includes a last having the upper mounted thereon and the insole located on its bottom with said margin portion extending away from the insole; wiping means mounted for movement from a retracted position in which the wiping means is out of engagement with the shoe assembly to an advanced position so that the wiping means engages said margin portion and wipes it against the insole; means for initially maintaining the wiping means in its retracted position; an applicator; means mounting the applicator for movement toward and away from the shoe assembly bottom; extruding means operable to extrude cement from the applicator; means for positioning the applicator against said margin portion; means for thereafter operating the extruding means to extrude cement against said margin portion; means for thereafter moving the applicator away from the insole along said margin portion to spread the cement along said margin portion; and means for thereafter moving the wiping means from its retracted position to its advanced position to wipe said margin portion inwardly against the insole and cause said margin portion to be attached to the insole by the cement.

14. The machine as defined in claim 13 further comprising: means responsive to the commencement of the movement of the applicator along said margin portion to terminate the extrusion of cement.

15. A machine for wiping a selected portion of the margin of a shoe upper against the corresponding portion of a shoe insole comprising: a support for supporting bottom-up a shoe assembly that includes a last having the upper mounted thereon and the insole located on its bottom with said margin portion extending upwardly away from the insole; wiping means mounted for movement from a retracted position in which the wiping means is out of engagement with the shoe assembly to an advanced position so that the wiping means engages said margin portion and wipes it against said insole; means for initially maintaining the wiping means in its retracted position; an applicator having a peripheral face that is complementary to the shape of said margin portion; means mounting the applicator for heightwise movement toward and away from the insole; extruding means operable to extrude cement from said peripheral face; means for initially locating the applicator above the shoe assembly; means for moving the applicator in a direction to bring said peripheral face against said margin portion; means for thereafter operating the extruding means to extrude cement against said margin portion; means for thereafter raising the applicator away from the insole so that said peripheral face moves along said margin portion to spread the cement along said margin portion; and means for thereafter moving the wiping means from its retracted to its advanced position to wipe said margin portion inwardly against the insole and cause said margin portion to be attached to the insole by the cement.

16. A machine for wiping a selected portion of the margin of a shoe upper against the corresponding portion of a shoe insole comprising: a support for supporting bottom-up a shoe assembly that includes a last having the upper mounted thereon and the insole located on its bottom with said margin portion extending upwardly away from the insole; means mounting the support for heightwise movement; wiping means mounted for movement from a retracted position in which the wiping means is out of engagement with the shoe assembly to an advanced position so that the wiping means engages said margin portion and wipes it against said insole; means for initially maintaining the wiping means in its retracted position; means for initially maintaining the support in a lowered position so that the insole is below the level of the wiping means; an applicator having a peripheral face that is complementary to the shape of said margin portion; means mounting the applicator for heightwise movement toward and away from the insole and for movement along the insole; extruding means operable to extrude cement from said peripheral face; means for initially locating the applicator above the shoe assembly and offset from said margin portion; a hold-down foot located above the shoe assembly with its bottom slightly below the bottom of the wiping means; means for lowering the applicator against the insole with the peripheral face spaced inwardly of said margin portion; means for moving the applicator along the insole in a direction to bring the peripheral face against said margin portion and for raising the support to clamp the shoe assembly against the hold-down foot; means for thereafter operating the extruding means to extrude cement against said margin portion; means for thereafter raising the applicator away from the insole so that said peripheral face moves along said margin portion to spread the cement along said margin portion; and means for thereafter moving the wiping means from its retracted to its advanced position to wipe said margin portion inwardly against the insole and cause said margin portion to be attached to the insole by the cement.

17. A machine for wiping a selected portion of the margin of a shoe upper against the corresponding portion of a shoe insole comprising: wiping means mounted for movement in a wiping stroke from a retracted to an advanced position; a support adjacent the wiping means, mounted for heightwise movement, for supporting bottom-up a shoe assembly that includes a last having the upper mounted thereon with said upper portion facing the wiping means and said insole located on the last bottom; a hold-down located above the support; a hold-down foot on the hold-down so located that its bottom is slightly below the bottom of the wiping means; a cement applicator mounted on the hold-down for heightwise movement; extruding means operable to extrude cement from the applicator; and means for imparting each of the aforesaid movements; whereby the wiping means is initially maintained in its retracted position, the support is initially maintained in a lower position with the insole spaced from the hold-down foot, the applicator is initially maintained in an elevated position spaced from the insole, the applicator is lowered against the insole and brought to bear against said margin portion and the support is raised to clamp the shoe assembly against the hold-down foot, the extruding means is operated to extrude cement from the applicator against said margin portion, the applicator is raised to spread the cement on said margin portion, and the wiping means is moved through its wiping stroke to wipe said margin portion inwardly against the insole and cause said margin portion to be attached to the insole by the cement.

18. The machine as defined in claim 17 wherein the applicator comprises: a peripheral face adapted to bear against said margin portion; at least one port intersecting said peripheral face; conduit means interconnecting said port and said extruding means through which the cement flows in response to operation of said extruding means; and means operative to block said conduit means and thus terminate the extrusion of cement through the port in response to the rise of the applicator to spread the cement on said margin portion.

19. A machine for wiping a selected portion of the margin of a shoe upper against the corresponding portion of a shoe insole comprising: wiping means mounted for movement in a wiping stroke from a retracted to an advanced position; a support adjacent the wiping means, mounted for heightwise movement, for supporting bottom-up a shoe assembly that includes a last having the upper mounted thereon with said selected portion facing the wiping means and said insole located on its bottom; a hold-down located above the support mounted for forward movement between an out-of-the-way position relatively remote from the shoe assembly to a working position above the insole and inwardly of said margin portion and for rearward movement back to the out-of-the-way position; a hold-down foot on the hold-down so located that its bottom is slightly below the bottom of the wiping means; a cement applicator mounted on the hold-down for heightwise movement; extruding means operable to extrude cement from the applicator; and means for imparting each of the aforesaid movements; whereby the wiping means is initially maintained in its retracted position, the hold-down is initially maintained in its out-of-the-way position, the support is initially maintained in a lower position with the insole spaced from the hold-down foot, the applicator is initially maintained in an elevated position spaced from the insole, the hold-down is moved forwardly from its remote position over the insole and inwardly of said margin portion, the applicator is lowered against the insole, the hold-down is moved rearwardly an amount sufficient to cause the applicator to bear against said margin portion and the support is raised to clamp the shoe assembly against the hold-down foot, the extruding means is operated to extrude cement from the applicator against said margin portion, the applicator is raised to spread the cement on said margin portion, and the wiping means is moved through its wiping stroke to wipe said margin portion inwardly against the insole and cause said margin portion to be attached to the insole by the cement.

20. The machine as defined in claim 19 further comprising: a frame in which the hold down is mounted for the aforesaid movements; cooperative locking members on the frame and the hold-down; and means for positioning the locking members in locking relationship during the rearward movement of the hold-down to thereby lock the hold-down against rearward movement when the applicator is bearing against said margin portion.

21. A mechanism for applying cement to a portion of the margin of a shoe upper comprising: an applicator mounted for heightwise movement; a peripheral face on said applicator; at least one port intersecting said peripheral face; extruding means operable to extrude cement through said port; conduit means interconnecting said port and said extruding means; means for placing the applicator in a lower position with the peripheral face bearing against said margin portion; means for operating the extruding means to force cement through the conduit means and the port against said margin portion; means for raising the applicator to cause the peripheral face to spread the cement on the margin portion; and means operative in response to the rise of the applicator to block said conduit means and thus terminate the extrusion of cement through the port.

22. A mechanism for applying cement to a portion of the margin of a shoe upper comprising: a housing; a heightwise extending orifice in the housing; a plunger movably mounted in the orifice; drive means connected to the plunger to effect its movements; an applicator connected to the bottom of the plunger; a peripheral face on said applicator; at least one port intersecting said peripheral face; extruding means operable to extrude cement through said port; conduit means interconnecting said port and said extruding means comprising a groove in the periphery of the plunger, a bore extending heightwise in the plunger whose bottom is in communication with the port and whose top is in communication with the groove, and a passage in the housing intersecting the orifice and in communication with the said extruding means; means for actuating the drive means to place the applicator in a lower position with the peripheral face bearing against said margin portion and with the passage and groove in alignment so that cement can pass therethrough; means for operating the extruding means to force cement through the conduit means and the port against said margin portion; and means for actuating the drive means to raise the applicator to cause the peripheral face to spread the cement on the margin and to move the groove out of alignment with the passage and thus block the conduit means to terminate the extrusion of cement through the port.

23. A mechanism for use preparatory to wiping a selected portion of the margin of a shoe upper against the corresponding portion of a shoe insole by applying cement to at least one of said portions comprising: a support mounted for heightwise movement for supporting bottom-up a shoe assembly that includes a last having the upper mounted thereon and the insole located on its bottom; a hold-down located above the support; a hold-down foot on the hold-down; a cement applicator mounted on the hold-down for heightwise movement between a first position that is above the bottom of the hold-down foot and a second position that is at least substantially coextensive with the bottom of the hold-down foot; extruding means operable to extrude cement from the applicator; means for initially maintaining the applicator in said first position; means for initially maintaining the support in a lowered position wherein the insole bottom is spaced from the hold-down foot; means for raising the support to cause the insole bottom to bear against the hold-down foot and for lowering the applicator to said second position wherein the applicator is proximate to the portion that is to have the cement applied thereto; and means for thereafter operating the extruding means.

24. The mechanism as defined in claim 23 wherein the cement is applied to said margin portion and further comprising: a peripheral face on the applicator adapted to bear against said margin portion; at least one port intersecting said peripheral face; conduit means interconnecting said port and said extruding means through which the cement flows in response to operation of said extruding means; means, operative subsequent to the operation of the extruding means, for raising the applicator from said second position; and means operative to block said conduit means and thus terminate the extrusion of cement through the port in response to the rise of the applicator from said second position.

25. A mechanism for use preparatory to wiping a selected portion of the margin of a shoe upper against the corresponding portion of a shoe insole by applying cement to at least one of said portions comprising: a support mounted for heightwise movement for supporting bottom-up a shoe assembly that includes a last having the upper mounted thereon and the insole located on its bottom; a hold-down located above the support mounted for forward movement between and out-of-the-way position relatively remote from the shoe assembly and a working position above the shoe assembly bottom and inwardly of said margin portion and for rearward movement back to the out-of-the-way position; a hold-down foot on the hold-down; a cement applicator mounted on the hold-down for heightwise movement between a first position that is above the bottom of the hold-down foot and a second position that is at least substantially coextensive with the bottom of the hold-down foot; extruding means operable to extrude cement from the applicator; means for initially maintaining the hold-down in said out-of-the-way position and the applicator in said first position; means for initially maintaining the support in a lowered position wherein the insole bottom is spaced from the hold-down foot; means for moving the hold-down to its working position; means for thereafter raising the support to cause the insole bottom to bear against the hold-down foot, for lowering the applicator to said second position and for moving the hold-down rearwardly from its working position whereby the applicator is caused to bear against said margin portion in a location that is proximate to the portion that is to have the cement applied thereto; and means for thereafter operating the extruding means.

26. The mechanism as defined in claim 25 further comprising: a frame in which the hold-down is mounted for the aforesaid movements; cooperative locking members on the frame and the hold-down; and means for positioning the locking members in locking relationship during the rearward movement of the hold-down to thereby lock the hold-down against rearward movement when the applicator is bearing against said margin portion.

27. The mechanism as defined in claim 26 wherein the cooperative locking members comprise: a first lug on the hold-down; a second lug mounted in the frame for movement into and out of alignment with the first lug; means for initially maintaining the second lug out of alignment with the first lug; and means, operative subsequent to the movement of the hold-down to its working position, to move the second lug into alignment with the first lug.

References Cited by the Examiner
UNITED STATES PATENTS

| | | | |
|---|---|---|---|
| 2,097,572 | 11/1937 | Newhall | 118—410 |
| 2,290,204 | 7/1942 | Nugent | 12—145 |
| 2,467,384 | 4/1949 | Kamborian | 12—1 |
| 3,035,287 | 5/1962 | Vlcek et al. | 12—12.4 |
| 3,039,121 | 6/1962 | Weinschenk | 12—145 X |

PATRICK D. LAWSON, *Primary Examiner.*